Figure 1:
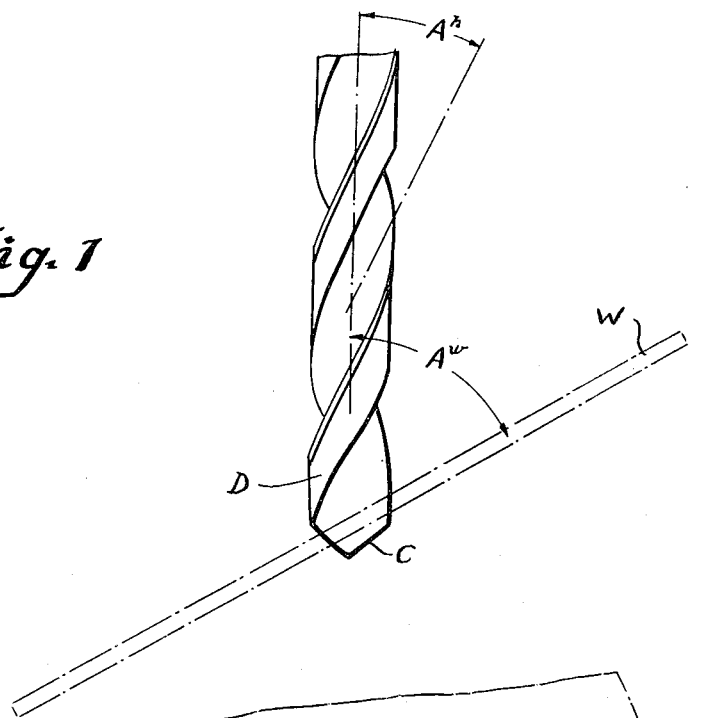

March 17, 1936.    G. D. HAYDEN ET AL    2,034,514
PROCESS OF MAKING TWIST DRILLS
Filed July 20, 1932

INVENTORS
George D. Hayden and
BY Howard K. Hayden
Swan Frye & Hardesty
ATTORNEYS.

Patented Mar. 17, 1936

2,034,514

UNITED STATES PATENT OFFICE 2,034,514

PROCESS OF MAKING TWIST DRILLS

George D. Hayden and Howard A. Hayden, Detroit, Mich., assignors to Ace Drill Company, Detroit, Mich., a corporation of Michigan Application July 20, 1932, Serial No. 623,580

8 Claims. (Cl. 76—108)

This invention relates to the manufacture of twist drills and particularly to the smaller sizes and straight shank types, although it will be understood to be applicable to all sizes and shank types, as well as to the manufacture of drills having any desired number or shape of flutes. An important object of the invention is the provision of a unique method of manufacturing such drills enabling production not only of superior drills to those now manufactured, but their production much more cheaply than is possible by present methods.

Another object of this invention is the elimination of the expensive straightening operation now necessary to be performed in the manufacture of drills, and the production of drills which are uniformly straight without the necessity of bending or otherwise straightening them.

It is the present practice to manufacture drills from an initially highly polished and accurately sized blank. In this the flutes are cut as the first operation, usually in a milling machine. The drills are then burred, then hardened and tempered, straightened, and then ground to outside size. The flutes are not ground, although they may be buffed to remove hardening stains. The use of accurately sized and polished blanks in this method is necessary because they must be guided thru bushings in the milling machines which form the flutes, and any looseness would of course cause chatter and so a rough finish. Use of milling machines in this manner of course also requires subsequent burring in most cases.

As above stated, the next step in this process now in common use is the hardening one. Due to the shape of the flutes, the hardening and tempering process causes an unusual degree of distortion of the drills, necessitating the insertion of an expensive hand straightening step in the process at this point, which involves the individual inspection and straightening of the drills. This operation is also of course rather slow.

The next step, that of grinding the outside cylindrical surface of the otherwise finished drill is also a difficult one, and results in considerable scrappage because of the difficulty of grinding the fluted blank to a perfect cylinder. In order to overcome the danger of breakage which is present if the drills are out of round because of an imperfect grinding operation, the drills are frequently given a slight back taper. This is rendered unnecessary by the improved process herein disclosed, which always produces drills truly cylindrical throughout.

Another common trouble with drills as now made is caused by the presence of soft or decarbonized areas on the surface of the drills. These are caused by burning out of the carbon on the surface of the steel during heat treating. The drill being hardened after the flutes are formed, and the flutes not ordinarily being sufficiently ground to remove these soft spots, they remain in many drills, and cause them to fail in service. They are all removed in the present improved process, in which the initial grinding operation, which is performed after hardening and tempering, is sufficient to remove all such areas. This improved process will be seen to overcome all of the aforementioned difficulties, producing uniform, truly cylindrical and perfect drills, which are nevertheless manufacturable more quickly and economically than the less perfect drills heretofore made.

Still further objects will readily occur to those skilled in the art upon reference to the following description and the accompanying drawing in which Fig. 1 is a diagrammatic plan view fragmentarily showing a drill, and designating a suitable positioning of the grinding wheel in carrying out the present improved process as well as indicating the relative angularity between the grinding wheel, the axis of the drill and the helical flute path.

Figure 2:
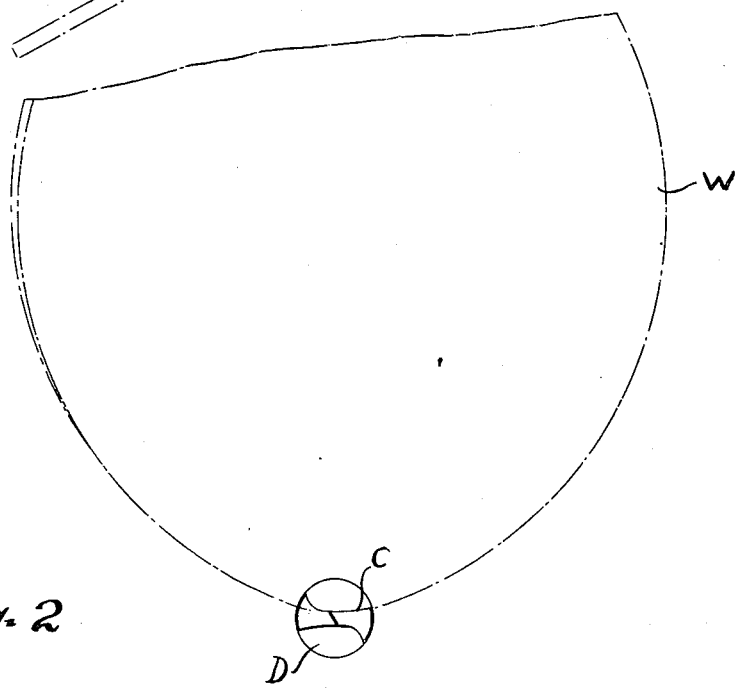

Fig. 2 is a diagrammatic plan view showing the end of a drill and illustrating the manner in which the grinding wheel, which is diagrammatically represented, forms the cutting edge of the drill.

The various steps of the new process are preferably performed as follows:

The same stock is used as heretofore, insofar as the nature of the material is concerned; but instead of using highly polished and accurately sized bars, rough hot rolled bars are used, sufficiently oversized to insure removal of all decarbonized surface areas in the first grinding. This oversize allowance is somewhat greater than that allowed with the polished rods now in use, but the cost of the rough hot rolled stock is much less than that of the highly finished and accurately sized blanks.

The rough blanks are first properly hardened and tempered. The distortion which occurs during such hardening is not great. Since the blanks are solidly cylindrical, they do not tend to warp to any such extent as do the already fluted blanks when hardened during the more usual process of drill making in which the flutes are formed before hardening. Such distortion as does occur is negligible and is removed during subsequent operations. The individual inspection and straightening step is therefore omitted as unnecessary in this improved process.

The hardened and tempered blanks are next ground directly to the finished outside diameter, and are then perfectly cylindrical in shape, as this grinding of course removes any slight warping the hardening may have caused. If the customer desires, a back taper may be formed during this grinding, although as above noted this is unnecessary, since the resulting drills are of accurately cylindrical form and the taper is intended to eliminate the danger of breaking drills which are slightly out of round.

The next step is the fluting operation, which is preferably done by grinding. The flutes might of course be ground by means of a wheel the thickness of the desired flute width, arranged during the grinding at the desired helix angle of the flute relatively to the drill, and having an edge dressed to the desired flute contour. Preferably, however, a wheel is used which is relatively very thin and quite large in diameter, as diagrammatically indicated at W as in Fig. 1, and the flutes are ground with the wheel arranged at a greater angle relatively to the axis of the drill (D) than the helix angle. This arrangement is clearly shown in Fig. 1, in which $A^h$ represents the helix angle and $A^w$ the wheel angle. The radius of the flute will be seen to depend upon the angularity of the wheel. By using a wheel of greater radius than the desired slot or flute but materially narrower than the same, sufficient variation of the flute radius may be obtained by tilting the wheel to various angles relatively to the helix angle of the flute. As the wheel approaches the helix angle in being so turned, the flute ground thereby decreases in radius, and reaches the shape of the edge of the wheel as the helix angle is reached, while as the wheel is turned from this position toward perpendicularity with respect to the helix angle, the radius of the flute increases to that of the wheel as a limit. Preferably a plurality of light cuts are made rather than a single heavy one, and the wheel rotated at high speed. In this manner heating of the work sufficiently to endanger the temper may be prevented.

As shown in Fig. 2, the curvature of the cutting edge (C) also depends upon the angularity of the wheel, as well as its curvature, and is controllable by varying the angle of the wheel.

The disclosed grinding method eliminates all necessity for dressing the wheel, since the shape of its edge is immaterial. Any desired relative movement may be imparted to the wheel and drill to obtain the desired flute helices. A suitable method is to slowly rotate the drill while advancing the wheel therealong. Utilizing a relatively very thin wheel in this manner, so arranged that the flute radius depends upon the angle at which the wheel is disposed, enables utilizing the same wheel for a variety of drill sizes, and is of course considerably more economical for the additional reason that no dressing of the wheel is required.

Remaining operations such as clearing, sharpening the point, marking, etc. may be performed in the conventional or any desired manner.

Now having described the invention and the preferred embodiments thereof it is to be understood that said invention is to be limited, not to the specific details herein set forth, but only by the scope of the claims which follow:—

What we claim is:

1. The process of forming a fluted drill which comprises first hardening a blank, then grinding the blank to cylindrical form, and then grinding to form the flutes by means of a thin grinding wheel arranged at an angle relative to the desired directional extent of the flute.

2. The process of forming a flute in a drill which comprises removing material therefrom by means of a forming tool having a forming edge thinner than the desired flute and arranged to travel in a path disposed at an angle less than normal relative to the flute.

3. The process of forming a flute in a drill which includes generating a slot therein by means of a disc-like forming tool thinner than the desired flute and arranged to contact the work while rotating in a plane disposed at an oblique angle relative to the flute.

4. The process of forming a fluted drill which includes first hardening a rod, then grinding the same cylindrical form, and then generating a flute therein without substantially affecting the hardness thereof by means of a work forming tool thinner than the desired flute.

5. The process of forming a fluted twist drill which includes first hardening a rod, then grinding the same to cylindrical form, and then grinding a flute therein by means of a grinding wheel materially thinner than the width of the desired flute and arranged to contact the work while rotating in a plane disposed at an oblique angle relatively to the helix angle of the flute.

6. The process of forming a helically fluted twist drill from a rod which comprises producing a flute by removing material from said rod by means of a forming tool having a forming edge thinner than the width of the desired flute and arranged at an oblique angle with respect to the desired helix angle of the flute.

7. The process of forming a fluted twist drill from a rod which comprises producing a flute by removing material from said rod by means of a forming tool having a forming edge thinner than the width of the desired flute and arranged to act upon the work in a plane of operation disposed at an oblique angle with respect to said flute.

8. The process of forming a fluted twist drill from a rod which comprises producing a flute by removing material from said rod by means of a forming wheel having a forming periphery thinner than the width of the desired flute and rotating in a plane disposed at an oblique angle with respect to said flute.

GEORGE D. HAYDEN.
HOWARD A. HAYDEN.